(12) United States Patent
Choi et al.

(10) Patent No.: US 11,454,704 B2
(45) Date of Patent: Sep. 27, 2022

(54) TARGET DETECTION APPARATUS AND METHOD AND VEHICLE CONTROL APPARATUS AND METHOD

(71) Applicant: HL KLEMOVE CORP., Incheon (KR)

(72) Inventors: Jung Hwan Choi, Seongnam-si (KR); Han Byul Lee, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 365 days.

(21) Appl. No.: 16/593,364

(22) Filed: Oct. 4, 2019

(65) Prior Publication Data

US 2020/0110157 A1 Apr. 9, 2020

(30) Foreign Application Priority Data

Oct. 8, 2018 (KR) .......................... 10-2018-0120084

(51) Int. Cl.
*G01S 7/41* (2006.01)
*G01S 13/89* (2006.01)
*G01S 13/931* (2020.01)

(52) U.S. Cl.
CPC .............. *G01S 7/411* (2013.01); *G01S 13/89* (2013.01); *G01S 13/931* (2013.01)

(58) Field of Classification Search
CPC .... G01S 7/292; G01S 7/354; G01S 7/41–415; G01S 13/50; G01S 13/66; G01S 13/72; G01S 13/931
See application file for complete search history.

(56) References Cited

U.S. PATENT DOCUMENTS

| | | | |
|---|---|---|---|
| 9,874,634 B1* | 1/2018 | Moriuchi | G01S 13/93 |
| 2008/0231496 A1* | 9/2008 | Sakamoto | G01S 7/354 |
| | | | 342/159 |
| 2008/0231497 A1* | 9/2008 | Sakamoto | G01S 13/345 |
| | | | 342/159 |
| 2009/0096661 A1* | 4/2009 | Sakamoto | G01S 13/345 |
| | | | 342/92 |
| 2012/0056773 A1* | 3/2012 | Sato | G01S 13/345 |
| | | | 342/109 |
| 2012/0268313 A1* | 10/2012 | Shimizu | G01S 13/48 |
| | | | 342/107 |
| 2013/0207832 A1* | 8/2013 | Mizutani | G01S 13/58 |
| | | | 342/107 |
| 2013/0207833 A1* | 8/2013 | Mizutani | G01S 13/06 |
| | | | 342/107 |
| 2013/0207834 A1* | 8/2013 | Mizutani | G01S 7/411 |
| | | | 342/107 |
| 2013/0257642 A1* | 10/2013 | Kawabe | G01S 13/584 |
| | | | 342/70 |
| 2015/0097718 A1* | 4/2015 | Sato | G01S 7/02 |
| | | | 342/147 |

(Continued)

*Primary Examiner* — Peter M Bythrow
(74) *Attorney, Agent, or Firm* — Hauptman Ham, LLP

(57) ABSTRACT

Embodiments disclosed herein relate to a target detection apparatus and method, and a vehicle control apparatus and method. A vehicle control apparatus includes: an image sensor operable to be disposed at a vehicle so as to have a field of view of exterior of the vehicle, the image sensor configured to capture image data; a processor configured to process the image data captured by the image sensor; and a controller configured to select a control target responsive at least in part to processing by the processor of the image data.

9 Claims, 30 Drawing Sheets

(56) References Cited

U.S. PATENT DOCUMENTS

| | | | |
|---|---|---|---|
| 2015/0338506 A1* | 11/2015 | Yu | G01S 7/35 |
| | | | 342/27 |
| 2016/0299216 A1* | 10/2016 | Matsumoto | G01S 13/867 |
| 2017/0205494 A1* | 7/2017 | Shimizu | G08G 1/166 |
| 2017/0307727 A1* | 10/2017 | Goda | G01S 13/341 |
| 2017/0307749 A1* | 10/2017 | Shimizu | G01S 13/584 |
| 2017/0315224 A1* | 11/2017 | Mizutani | G01S 7/352 |
| 2018/0172813 A1* | 6/2018 | Rao | G06F 17/142 |
| 2020/0081110 A1* | 3/2020 | Nam | G01S 13/931 |
| 2021/0072398 A1* | 3/2021 | Matsunaga | G01S 17/93 |
| 2021/0389420 A1* | 12/2021 | Roger | G01S 13/931 |

* cited by examiner

TARGET DETECTION APPARATUS AND METHOD AND VEHICLE CONTROL APPARATUS AND METHOD

CROSS REFERENCE TO RELATED APPLICATION

This application claims priority from Korean Patent Application No. 10-2018-0120084, filed on Oct. 8, 2018, which is hereby incorporated by reference for all purposes as if fully set forth herein.

BACKGROUND OF THE INVENTION

1. Field of the Invention

Embodiments disclosed herein relate to a signal processing system, and more particularly, to a target detection apparatus and method, and a vehicle control apparatus and method.

2. Description of the Prior Art

A signal processing system may mean a system capable of processing a signal measured through a sensor so as to detect a target.

Nowadays, such a signal processing system is becoming simpler in hardware because of the downsizing of radar sensors, the enhancement of price competitiveness, and so on. As a result, in the signal processing system, a signal quality deterioration phenomenon appears at present, which leads to non-sensing and erroneous sensing of a target.

In recent years, research on a signal processing system capable of reducing occurrence of non-sensing and erroneous sensing of a target have been actively conducted.

SUMMARY OF THE INVENTION

Embodiments disclosed herein (hereinafter, referred to as "the present embodiments") have been made to solve the above-mentioned problems, and aim to provide a target detection apparatus capable of reducing occurrence of non-sensing and erroneous sensing of a target.

In order to achieve the aspects described above, an aspect of the present embodiments provides a vehicle control apparatus including: an image sensor operable to be disposed at a vehicle so as to have a field of view of exterior of the vehicle, the image sensor configured to capture image data; a processor configured to process the image data captured by the image sensor; and a controller configured to select a control target responsive at least in part to processing by the processor of the image data, in which the controller generates an object, responsive at least in part to processing by the processor of the image data, determines whether or not an object corresponding to the control target is generated on the basis of the generated object, generates an object by feeding back information associated with the control target in a previous scan depending on a determination result, and selects a control target on the basis of the generated object.

In addition, in order to achieve the aspects described above, an aspect of the present embodiments provides a target detection apparatus including: a generation unit configured to generate an object on the basis of signal information; and a providing unit configured to determine whether or not an object corresponding to a control target is generated on the basis of the generated object, and to feed back information associated with the control target in a previous scan to the generation unit depending on a determination result.

In addition, in order to achieve the aspects described above, an aspect of the present embodiments provides a vehicle control apparatus including: a sensor module configured to measure a signal reflected from a target; and a target detection module configured to generate an object on the basis of the signal information acquired on the basis of the signal reflected from the target, to determine whether or not an object corresponding to the control target is generated on the basis of the generated object, to generate an object by feeding back information associated with a control target in a previous scan depending on a determination result, and to select a control target on the basis of the generated object; and a control module configured to control a vehicle according to the control target.

In addition, in order to achieve the aspects described above, an aspect of the present embodiments provides a target detection method including: generating an object on the basis of signal information; and determining whether or not an object corresponding to a control target is generated on the basis of the generated object, and feeding back information associated with the control target in a previous scan to the generating of the object depending on a determination result.

In addition, in order to achieve the aspects described above, an aspect of the present embodiments provides a vehicle control method including: measuring a signal reflected from a target; generating an object on the basis of the signal information acquired on the basis of the signal reflected from the target, determining whether or not an object corresponding to the control target is generated on the basis of the generated object, generating an object by feeding back information associated with a control target in a previous scan depending on a determination result, and selecting a control target on the basis of the generated object so as to detect the target; and controlling a vehicle according the control target.

According to the above-described target detection apparatus and vehicle control apparatus of the present embodiments, even if an object is not created in a current scan since the target SNR is lowered due to the deterioration of signal quality, it is possible to reduce occurrence of non-sensing and erroneous sensing of the target and to improve vehicle control by feeding back the information contained in the control target track in a previous scan so as to create an object and to detect the target.

In addition, according to the above-described target detection apparatus and vehicle control apparatus of the present embodiments, when the target SNR is lowered and frequency peak information cannot be extracted through a CFAR algorithm, it is possible to reduce occurrence of non-sensing and erroneous sensing of a target and to improve vehicle control by creating an object in the control target track on the basis of the information contained in the control target track in the previous scan so as to extract frequency peak information and detecting the target on the basis of the frequency peak information. Further, according to the target detection apparatus and the vehicle control apparatus of the present embodiments, it is possible to increase the reaction speed with respect to the current situation even if a situation in which an object is not generated in the control target track in the current scan by performing a thorough comparison between the feedback information and the current signal information as well as the evaluation of the limited situation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
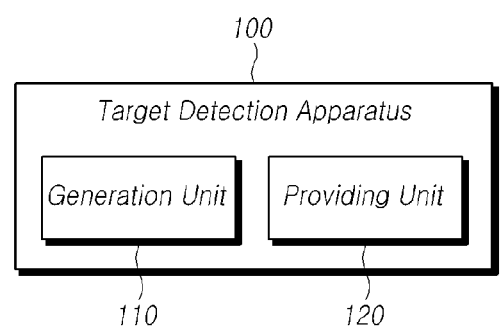
FIG. 1 is an overall block diagram for explaining a target detection apparatus according to the present embodiments.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. The expression "and/or" includes any or all combinations of items enumerated together.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure.

In the following description of the embodiments of the present disclosure, a detailed description of known functions and configurations incorporated herein will be omitted when it may make the subject matter of the present disclosure unclear. Meanwhile, terms described later are defined in consideration of the functions of the present disclosure, but the meaning of the terms may be changed according to a user, intention of an operator, or convention. Therefore, the definitions of the terms should be made based on the contents throughout the specification.

Hereinafter, a target detection apparatus according to the present embodiments will be described with reference to the accompanying drawings.

FIG. 1 is an overall block diagram for explaining a target detection apparatus according to the present embodiments.

Referring to FIG. 1, the target detection apparatus 100 according to the present embodiments may include a generation unit 110, a providing unit 120, and the like.

That is, the target detection apparatus 100 according to the present embodiments may include: a generation unit 110 configured to generate an object on the basis of signal information; and a providing unit 120 configured to determine, on the basis of the object, whether or not an object corresponding to the control target is generated and to feed back information associated with the control target in previous scan to the generation unit 110 according to a determination result.

Specifically, the generation unit 110 may be provided with the signal information. The generation unit 110 may generate an object on the basis of the received signal information. For example, the generation unit 110 may generate an object on the basis of the signal information in current scan.

Here, the generation unit 110 may extract object information on the basis of the signal information, and may generate an object on the basis of the object information. For example, the generation unit 110 may extract object information on the basis of the signal information in the current scan, and may generate an object on the basis of the object information.

In addition, the generation unit 110 may extract frequency peak information from the signal information, may pair the frequency peak information so as to extract object information, and may generate an object on the basis of the object information. For example, the generation unit 110 may extract frequency peak information on the basis of the signal information in the current scan, may pair the frequency peak information so as to extract object information, and may generate an object on the basis of the object information.

That is, the generation unit 110 may extract frequency peak information from the signal information using a signal processing algorithm.

Here, the signal processing algorithm may include a frequency extraction algorithm.

In particular, the frequency extraction algorithm may include a Constant False Alarm Rate (CFAR) algorithm. However, without being limited thereto, the frequency extraction algorithm may include any algorithm as long as frequency peak information can be extracted using the algorithm.

Thus, the generation unit 110 may extract the frequency peak information from the signal information using the CFAR algorithm in up-chirp and down-chirp.

In addition, the generation unit 110 may extract the object information by pairing the frequency peak information using a signal processing algorithm.

Here, the signal processing algorithm may include an object pairing algorithm. However, without being limited thereto, the signal processing algorithm may include any algorithm as long as object information can be extracted using the algorithm.

Here, the object information may include at least one of distance information and speed information. However, without being limited thereto, the object information may include any information as long as the information is associated with the object.

In addition, the generation unit 110 may generate an object on the basis of the object information using the signal processing algorithm.

Here, the signal processing algorithm may include an object generation algorithm. However, without being limited thereto, the signal processing algorithm may include any algorithm as long as an object can be generated using the algorithm.

The generation unit 110 may provide an object.

Specifically, the generation unit 110 may be connected to at least one of the providing unit 120 and the tracking unit 140, which will be described later. The generation unit 110 may provide the object to at least one of the providing unit 120 and the tracking unit 140, which will be described later.

The providing unit 120 may determine whether or not an object corresponding to the control target is generated on the basis of the object, and may feed back information associated with the control target in the previous scan to the generation unit 110 depending on the determination result.

That is, the providing unit 120 may determine whether or not an object corresponding to the control target is generated on the basis of the object, and when it is determined that the object corresponding to the control target is generated as the result of determination, the providing unit 120 may provide the object to the tracking unit 140, which will be described later.

In addition, the providing unit 120 may determine whether or not an object corresponding to the control target is generated on the basis of the object, and when it is determined that the object corresponding to the control target is not generated as the result of determination, the providing unit 120 may feed back the information associated with the control target in the previous scan to the generation unit 110.

Specifically, the providing unit 120 may determine whether or not an object corresponding to the control target is generated on the basis of the object.

That is, the providing unit 120 may be connected to the generation unit 110. The providing unit 120 may receive objects provided from the generation unit 110. The providing unit 120 may determine whether or not an object corresponding to the control target is generated on the basis of the objects provided from the generation unit 110.

In an example, the providing unit 120 may determine that an object corresponding to the control target is generated on the basis of the objects provided from the generation unit 110.

That is, when an object corresponding to the control target exists among the objects provided from the generation unit 110, the providing unit 120 may determine that an object corresponding to the control target is generated.

In another example, the providing unit 120 may determine that an object corresponding to the control target is not generated on the basis of the objects provided from the generation unit 110.

That is, when an object corresponding to the control target does not exist among the objects provided from the generation unit 110, the providing unit 120 may determine that an object corresponding to the control target is not generated.

Depending on the determination result as to whether or not the object corresponding to the control target is generated, the providing unit 120 may provide at least one of information and an object associated with the control target in the previous scan.

In an example, when it is determined that the object corresponding to the control target is generated as the result of determining whether or not an object corresponding to the control target is generated, the providing unit 120 may provide the object to the tracking unit 140, which will be described later.

In another example, when it is determined that the object corresponding to the control target is not generated as a result of determining whether or not the object corresponding to the control target is generated, the providing unit 120 may feed back the information associated with the control target in the previous scan to the generation unit 110.

Here, the information associated with the control target in the previous scan may include information contained in the control target track. However, without being limited thereto, the information associated with the control target may include any information as long as the information is associated with the control target in the previous scan.

Meanwhile, the generation unit 110 may generate an object on the basis of the information contained in the control target track in the previous scan.

Specifically, the generation unit 110 may be connected to the providing unit 120. The generation unit 110 may receive information associated with the control target in the previous scan and fed back from the providing unit 120. The generation unit 110 may generate an object on the basis of the information associated with the control target in the previous scan and fed back from the providing unit 120.

In addition, the generation unit 110 may extract object information corresponding to the control target on the basis of the information associated with the control target in the previous scan, and may generate an object on the basis of the object information corresponding to the control target.

In addition, the generation unit 110 may extract frequency peak information from the information associated with the control target in the previous scan, may pair the frequency peak information so as to extract object information corresponding to the control target, and may generate object information corresponding to the control target on the basis of the object information corresponding to the control target.

That is, the generation unit 110 may extract the frequency peak information from the information associated with the control target in the previous scan using a signal processing algorithm.

Thus, the generation unit 110 may extract the frequency peak information from the information associated with the control target in the previous scan using the CFAR algorithm in up-chirp and down-chirp.

In addition, the generation unit 110 may extract the object information corresponding to the control target by pairing the frequency peak information using the signal processing algorithm. In addition, the generation unit 110 may generate an object on the basis of the object information corresponding to the control target using the signal processing algorithm.

The generation unit 110 may provide the object to at least one of the providing unit 120 and the tracking unit 140.

Figure 2:
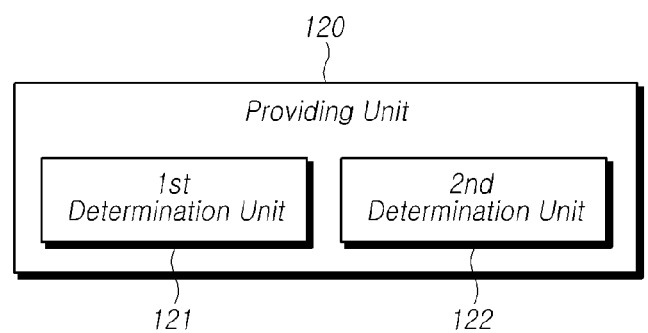
FIG. 2 is a specific block diagram for explaining a providing unit according to the present embodiments.

FIG. 2 is a specific block diagram for explaining a providing unit according to the present embodiments.

Referring to FIG. 2, the providing unit 120 according to the present embodiments may include a first determination unit 121, a second determination unit 122, and the like.

At least one of the first determination unit 121 and the second determination unit 122 may be connected to the generation unit 110. At least one of the first determination unit 121 and the second determination unit 122 may be provided with an object from the generation unit 110.

The first determination unit 121 may determine whether or not a control target track is present.

Specifically, the first determination unit 121 may be connected to the generation unit 110. The first determination unit 121 may be provided with an object from the generation unit 110. The first determination unit 121 may determine whether or not a control target track is present.

In an example, when the control target track exists, the first determination unit 121 may determine that the control target track exists. That is, when the control target track in the previous scan exists in the current scan, the first determination unit 121 may determine that the control target track exists in the current scan. The first determination unit 121 may provide at least one of a determination result as to whether the control target track exists, a determination result that the control target track exists when it is determined that the control target track exists, and an object to the second determination unit 122.

In another example, when the control target track does not exist, the first determination unit 121 may determine that the control target track does not exist. That is, when the control target track in the previous scan does not exist in the current scan, the first determination unit 121 may determine that the control target track does not exist in the current scan. When it is determined that the control target track does not exist as a result of determining whether the control target track exists, the first determination unit 121 may provide at least one of a determination result that the control target track does not exist and an object to the tracking unit 140, which will be described later.

The second determination unit 122 may determine whether or not an object exists in the control target track depending on the determination result as to whether or not the control target track exists, and may feed back the information contained in the control target track in the previous scan to the generation unit 110 depending on the determination result. When the first determination unit 121 determines that the control target track exists, that is when a determination result that the control target track exists is provided from the first determination unit 121, the second determination unit 122 may determine whether or not an object exists in the control target track.

When it is determined that the control target track exists, the second determination unit 122 may determine whether or not an object exists in the control target track, and when it is determined that the object does not exist in the control target track, the second determination unit 122 may feed back the information contained in the control target track in the previous scan to the generation unit 110. When the first determination unit 121 determines that the control target track does not exist, that is when a determination result that the control target track exists is not provided from the first determination unit 121, the second determination unit 122 may not determine whether or not an object exists in the control target track.

Depending on the determination result as to whether or not an object exists in the control target track, the second determination unit 122 may provide at least one of a determination result as to whether an object exist in the control target track, the information contained in the control target track in the previous scan, and the object.

Figure 3:
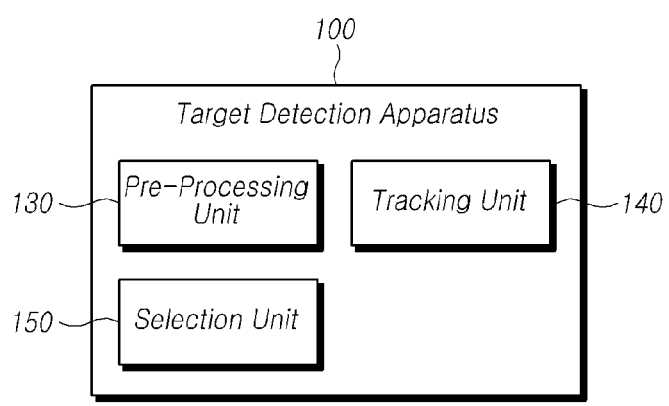
FIG. 3 is a specific block diagram illustrating a pre-processing unit, a tracking unit, and a selection unit according to the present embodiments.

FIG. 3 is a specific block diagram illustrating a pre-processing unit, a tracking unit, and a selection unit according to the present embodiments.

Referring to FIG. 3, the target detection apparatus 100 may further include at least one of a pre-processing unit 130, a tracking unit 140, and a selection unit 150.

The pre-processing unit 130 may pre-process a signal reflected from a target so as to acquire signal information.

Specifically, the pre-processing unit 130 may be provided with a signal reflected from the target. The pre-processing unit 130 may pre-process the signal reflected from the target so as to acquire signal information.

Here, the signal reflected from the target may include a time domain signal.

Here, the signal information may include frequency domain signal information.

Accordingly, the pre-processing unit 130 may pre-process a time domain signal reflected from the target so as to acquire frequency domain signal information.

The pre-processing unit 130 may be connected to the generation unit 110. The pre-processing unit 130 may provide the signal information to the generation unit 110. For example, the pre-processing unit 130 may provide frequency domain signal information to the generation unit 110.

Meanwhile, when the generation unit 110 receives the frequency domain signal information from the pre-processing unit 130, the generating unit 110 may generate an object on the basis of the frequency domain signal information.

Here, a description of a method of generating an object on the basis of frequency domain signal information is the same as that of the method of generating an object on the basis of the signal information described above with reference to FIGS. 1 and 2, and thus will be omitted for brevity of description.

The pre-processing unit 130 may pre-process the signal reflected from the target through a signal processing algorithm so as to acquire signal information. For example, the pre-processing unit 130 may pre-process a time domain signal reflected from the target through the signal processing algorithm so as to acquire frequency domain signal information.

The tracking unit 140 may track an object so as to generate track information.

Specifically, the tracking unit 140 may be connected to at least one of the generation unit 110 and the providing unit 120. The tracking unit 140 may receive an object from at least one of the generation unit 110 and the providing unit 120. The tracking unit 140 may generate track information by tracking the object received from the at least one of the generation unit 110 and the providing unit 120.

In particular, the tracking unit 140 may receive the object from the providing unit 120 and may perform tracking so as to generate track information.

The tracking unit 140 may be connected to at least one of the providing unit 120 and the selection unit 150, which will be described later. The tracking unit 140 may provide the track information to at least one of the providing unit 120 and the selection unit 150, which will be described later.

The tracking unit 140 may track an object through the signal processing algorithm so as to generate track information.

The selection unit 150 may select a control target on the basis of the track information.

Specifically, the selection unit 150 may be connected to the tracking unit 140. The selection unit 150 may receive track information from the tracking unit 140. The selection unit 150 may select (or generate) a control target on the basis of the track information received from the tracking unit 140.

The selection unit 150 may select a control target on the basis of the track information through a signal processing algorithm.

Here, the signal processing algorithm may include a target selection (or generation) algorithm on the basis of track information. However, without being limited thereto, the signal processing algorithm may include any algorithm as long as a target can be selected (or generated).

Hereinafter, a vehicle control apparatus according to the present embodiments will be described with reference to the accompanying drawings.

Figure 4:
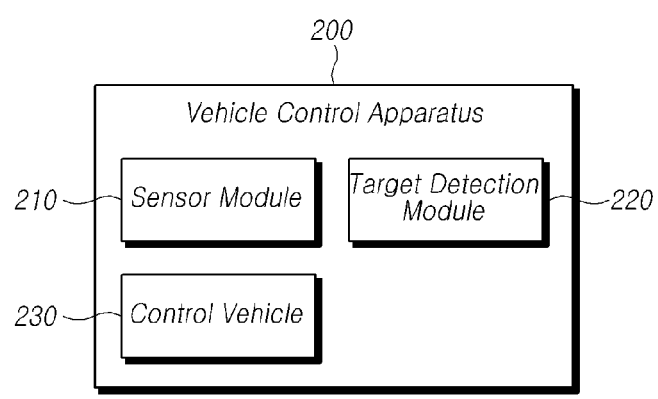
FIG. 4 is an overall block diagram for explaining a vehicle control apparatus according to the present embodiments.

FIG. 4 is an overall block diagram for explaining a vehicle control apparatus according to the present embodiments.

Referring to FIG. 4, the vehicle control apparatus 200 according to the present embodiments may include a sensor module 210, a target detection module 220, a control module 230, and the like. Here, the sensor module 210, the target detection module 220, and the control module 230 may be connected to each other so as to provide and receive information to and from each other.

That is, the vehicle control apparatus 200 according to the present embodiments may include: a sensor module 210 configured to measure a signal reflected from a target; a target detection module 220 configured to generate an object on the basis of the signal information acquired on the basis of the signal reflected from the target, to determine whether an object corresponding to the control target is generated on the basis of the object, to generate an object by feeding back information associated with the control target in previous scan depending on a determination result, and to select a control target on the basis of the generated object; and a control module 230 configured to control the vehicle according to the control target.

It can be understood that the target detection module 220 is the same component as the target detection apparatus 100 described above with reference to FIGS. 1 to 3. Thus, the target detection module 220, which will be described later, is capable of performing all the functions of the target detection apparatus 100 described above with reference to FIGS. 1 to 3. Therefore, the remaining modules except for the target detection module 220 will be described below.

The sensor module 210 may measure a signal reflected from a target.

Specifically, the sensor module 210 may transmit a signal. The sensor module 210 may measure a signal reflected from the target. The sensor module 210 may provide the signal reflected from the target to the target detection module 220.

Here, the signal reflected from the target may include a time domain signal.

The sensor module 210 may measure a signal reflected from the target through at least one sensor.

Here, at least one sensor may include a radar sensor. However, without being limited thereto, the at least one sensor may include any sensor as long as it can measure a signal reflected from the target. In particular, the at least one sensor may include an image sensor and a non-image sensor. However, without being limited thereto, the at least one sensor may include any sensor as long as it can measure the target.

The control module 230 may control the vehicle according to a control target.

Specifically, the control module 230 may be connected to the target detection module 220. The control module 230 may receive the control target from the target detection module 220. The control module 230 may control the operation of the vehicle on the basis of the control target received from the target detection module 220.

Figure 5:
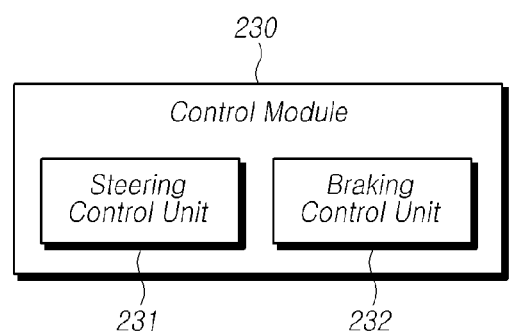
FIG. 5 is a specific block diagram for explaining a control module according to the present embodiments.

FIG. 5 is a specific block diagram for explaining a control module according to the present embodiments.

Referring to FIG. 5, the control module 230 according to the present embodiments may control at least one of vehicle steering and vehicle braking.

Accordingly, the control module 230 according to the present embodiments may include at least one of a steering control unit 231 and a braking control unit 232.

The steering control unit 231 may control vehicle steering according a control target.

Specifically, the steering control unit may be connected to the target detection module 220. The steering control unit 231 may receive the control target from the target detection module 220. The steering control unit 231 may control the vehicle steering on the basis of the control target received from the target detection module 220.

The braking control unit 232 may control vehicle braking according a control target.

Specifically, the braking control unit 232 may be connected to the target detection module 220. The braking control unit 232 may receive the control target from the target detection module 220. The braking control unit 232 may control the vehicle braking on the basis of the control target received from the target detection module 220.

Figure 6:
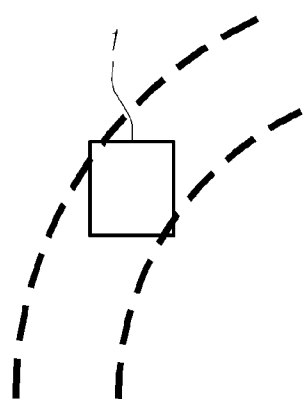
FIG. 6 is a diagram for explaining that an object is not generated in a control target track.

FIG. 6 is a diagram for explaining that an object is not generated in a control target track.

Referring to FIG. 6, nowadays, such a signal processing system is becoming simpler in hardware because of the downsizing of radar sensors, the enhancement of price competitiveness and so on. As a result, in the signal processing system, a signal quality deterioration phenomenon appears, which leads to non-sensing and erroneous sensing of a target.

Particularly, in the signal processing system, there is a problem that a target SNR is lowered due to deterioration of signal quality and an object is not created in the current scan.

As illustrated in the figure, an object may not be generated in the control target track 1.

Figure 7:
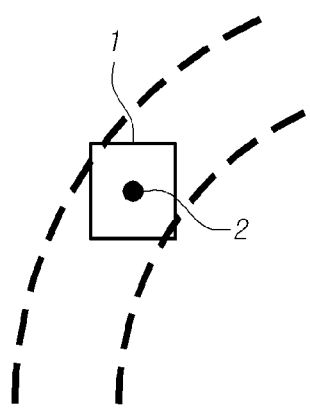
FIG. 7 is a diagram for explaining that a target is detected by generating an object on a control target track through the target detection apparatus and the vehicle control apparatus according to the present embodiments.

FIG. 7 is a diagram for explaining that a target is detected by generating an object on a control target track through the target detection apparatus and the vehicle control apparatus according to the present embodiments.

Referring to FIG. 7, even if an object is not created in a current scan since the target SNR is lowered due to the deterioration of signal quality, the target detection apparatus and the vehicle control apparatus according to the present embodiments are capable of reducing occurrence of non-sensing and erroneous sensing of the target, and improving vehicle control by feeding back the information contained in the control target track in a previous scan so as to create an object and to detect the target.

That is, as illustrated in the figure, even if an object is not generated in the control target track 1, the target detection apparatus and the vehicle control apparatus according to the present embodiments are capable of creating an object 2 in a control target track 1 on the basis of the information contained in the control target track in the previous scan.

The target detection apparatus and the vehicle control apparatus according to the present embodiments may include an ECU. However, without being limited thereto, the target detection apparatus and the vehicle control apparatus may include any control device (or system) as long as the control device is an electronically controllable device.

Hereinafter, a target detection method according to the present embodiments will be described with reference to the accompanying drawings. Particularly, a description of the portions overlapping with the target detection apparatus and the vehicle control apparatus according to the present embodiments described above with reference to FIGS. 1 to 7 will be omitted in the following for the sake of brevity of description.

The target detection method according to the present embodiments may be performed through the target detection apparatus and the vehicle control apparatus.

A target detection method according to the present embodiments may include: a step generating an object on the basis of signal information; and a step determining, on the basis of the object, whether or not an object corresponding to the control target is generated and feeding back information associated with the control target in previous scan to the generation unit 110.

Figure 8:
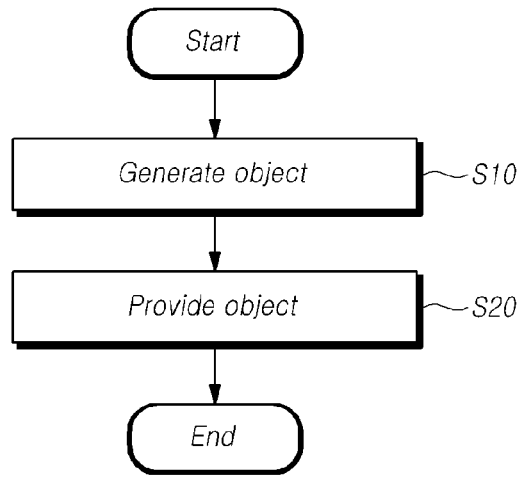
FIG. 8 is an overall flowchart for explaining a target detection method according to the present embodiments.

FIG. 8 is an overall flowchart for explaining a target detection method according to the present embodiments.

Referring to FIG. 8, the target detection method according to the present embodiments may include a step of generating an object and a step of providing the object.

First, an object may be generated (S10).

For example, in step S10, an object may be generated on the basis of signal information.

Then, the object may be provided (S20).

For example, in step S20, it is determined whether or not an object is generated on the basis of the object generated in step S10, and an object may be provided depending on the determination result.

Figure 9:
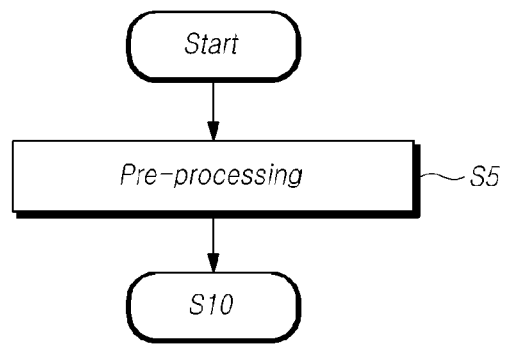
FIGS. 9 and 10 are block diagrams for explaining a pre-processing method according to the present embodiments.
Figure 10:
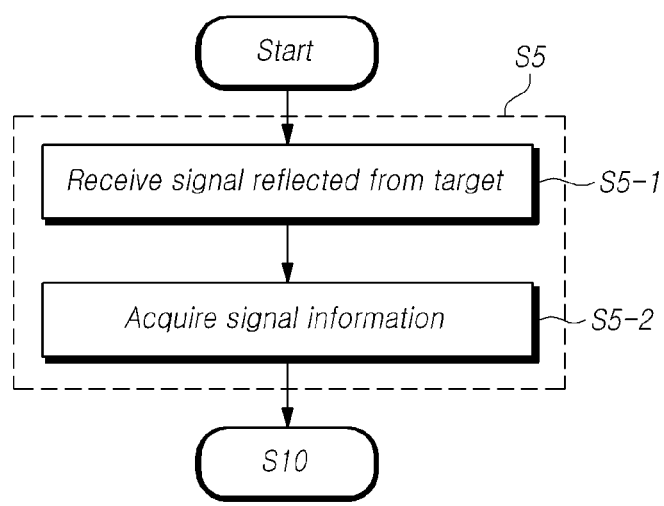

FIGS. 9 and 10 are block diagrams for explaining a pre-processing method according to the present embodiments.

Referring to FIG. 9, the pre-processing method according to the present embodiments may be performed before the step of generating an object (S10).

In the pre-processing method according to the present embodiments, signal information may be acquired by pre-processing the signal reflected from the target (S5).

Referring to FIG. 10, a signal reflected from the target may be received first (S5-1). Then, the signal information may be acquired by pre-processing the signal reflected from the target (S5-2).

Accordingly, in step S5-2, a time domain signal reflected from the target is pre-processed so as to acquire frequency domain signal information.

Meanwhile, when the frequency domain signal information is received from step S5-2, in step S10, an object may be generated on the basis of the frequency domain signal information.

Here, a description of a method of generating an object on the basis of frequency domain signal information is the same as that of the method of generating an object on the basis of the signal information, which will be described later, and thus will be omitted for brevity of description.

In step S5-2, signal information may be acquired by pre-processing the signal reflected from the target through a signal processing algorithm. For example, in step S5-2, frequency domain signal information may be acquired by pre-processing a time domain signal reflected from the target through the signal processing algorithm.

Figure 11:
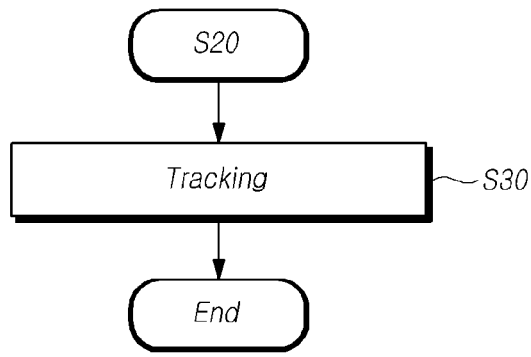
FIGS. 11 and 12 are block diagrams for explaining a tracking method according to the present embodiments.
Figure 12:
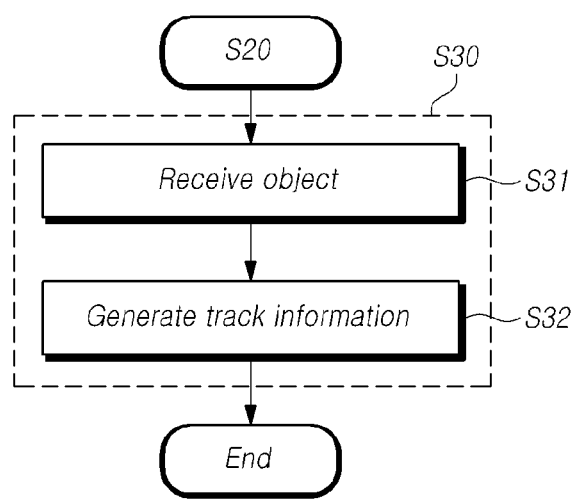

FIGS. 11 and 12 are block diagrams for explaining a tracking method according to the present embodiments.

Referring to FIG. 11, the tracking method according to the present embodiments may be performed after the step of providing the object (S20).

In the tracking method according to the present embodiments, track information may be generated by tracking the object (S30).

Referring to FIG. 12, an object may be provided first from step S20 (S31). Then, track information may be generated by tracking the object received from step S20 (S32).

In step S32, the track information may be generated by tracking the object through the signal processing algorithm.

Figure 13:
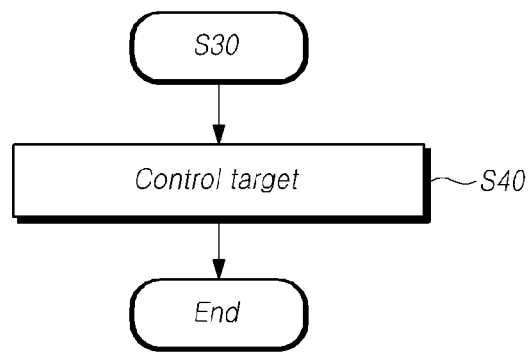
FIGS. 13 and 14 are block diagrams for explaining a control target selection method according to the present embodiments.
Figure 14:
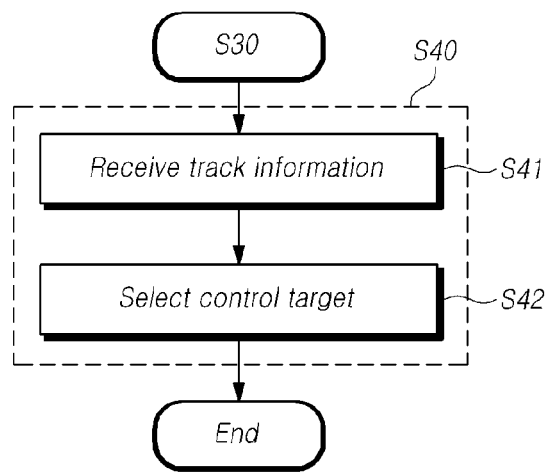

FIGS. 13 and 14 are block diagrams for explaining a control target selection method according to the present embodiments.

Referring to FIG. 13, the control target selection method according to the present embodiments may be performed after the tracking method (S30).

In the control target selection method according to the present embodiments, a control target may be selected on the basis of track information (S40).

Referring to FIG. 14, the track information may be provided first from step S30 (S41). Then, a control target may be selected (or generated) on the basis of track information provided from step S41 (S42).

In step S42, a control target may be selected on the basis of the track information through a signal processing algorithm.

Figure 15:
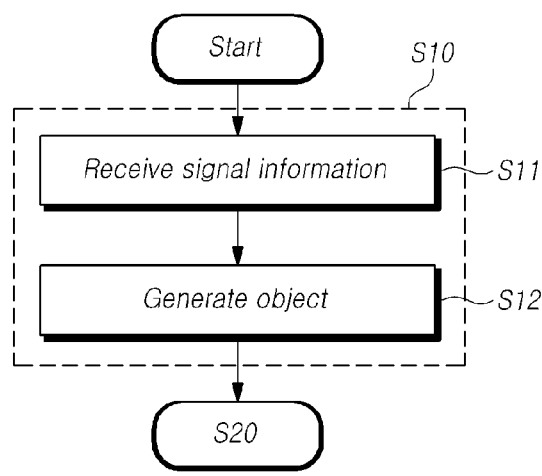
FIGS. 15 to 17 are specific flowcharts for explaining an object generation method according to the present embodiments.
Figure 16:
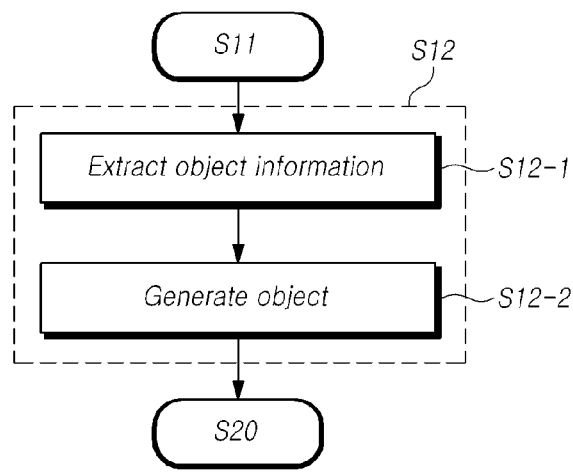
Figure 17:
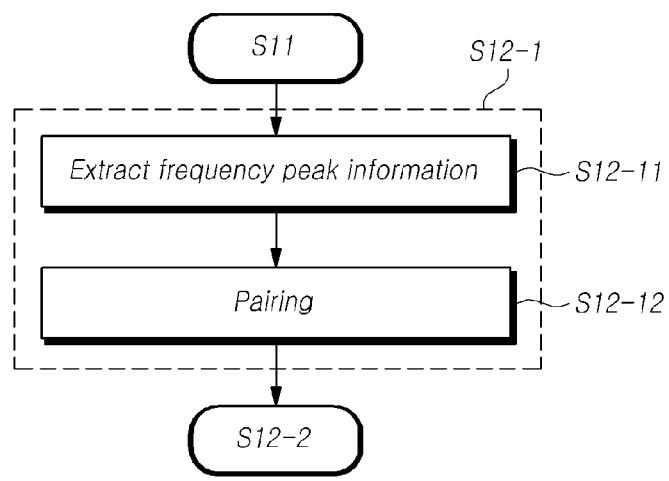

FIGS. 15 to 17 are specific flowcharts for explaining an object generation method according to the present embodiments.

Referring to FIGS. 15 to 17, an object generation method according to the present embodiments is capable of generating an object on the basis of signal information.

Referring to FIG. 15, signal information may be provided first (S11).

Thereafter, an object may be generated on the basis of the signal information provided from step S11 (S12). For example, in step S12, in the current scan, an object may be generated on the basis of signal information.

Referring to FIG. 16, in step S12, object information may be extracted on the basis of the signal information, and an object may be generated on the basis of the object information. For example, in step S12, in the current scan, object information may be extracted on the basis of the signal information, and an object may be generated on the basis of the object information.

Specifically, in step S12, object information may be extracted first on the basis of the signal information provided from step S11 (S12-1). Then, an object may be generated on the basis of the object information extracted in step S12-1 (S12-2).

Referring to FIG. 17, in step S12-1, frequency peak information may be extracted from signal information, and object information may be extracted by pairing the frequency peak information. In step S12-2, an object may be generated on the basis of the object information. For example, in step S12-1, in the current scan, frequency peak information may be extracted on the basis of signal information, and the frequency peak information may be paired so as to extract object information. In step S12-2, an object may be generated on the basis of the object information.

That is, frequency peak information may be extracted first (S12-11).

For example, in step S12-11, the frequency peak information may be extracted from the signal information using a signal processing algorithm.

Thus, in step S12-11, the frequency peak information may be extracted from the signal information using the CFAR algorithm in up-chirp and down-chirp.

Then, the object information may be extracted by pairing the frequency peak information (S12-12).

For example, in step S12-12, the object information may be extracted by pairing the frequency peak information using a signal processing algorithm.

Then, in step S12-2, an object may be generated on the basis of the object information.

For example, in step S12-2, an object may be generated on the basis of the object information using the signal processing algorithm.

FIGS. 18 to 25 are specific flowcharts for explaining an object providing method according to the present embodiments.

Figure 18:
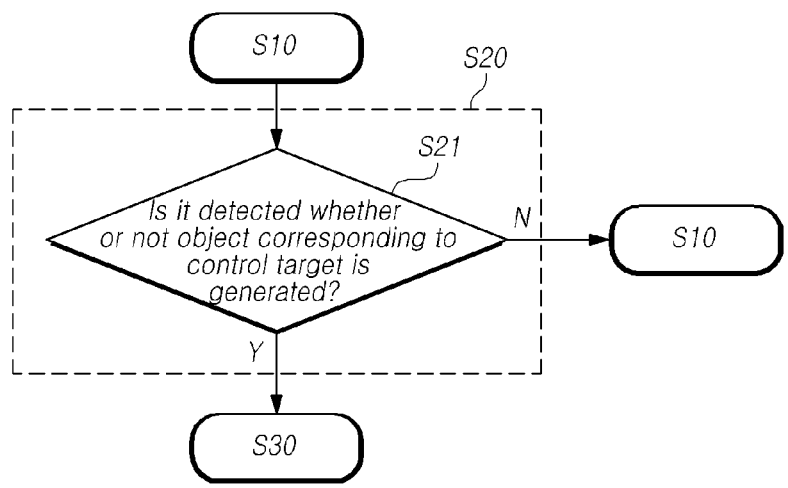
FIGS. 18 to 25 are specific flowcharts for explaining an object providing method according to the present embodiments.

Referring to FIG. 18, an object providing method according to the present embodiments, it may be determined whether or not an object corresponding to the control target is generated on the basis of the object, and information associated with the control target in the previous scan may be fed back to the step of generating an object (S10) depending on the determination result S20.

That is, in step S21, it may be determined whether or not an object corresponding to the control target is generated on the basis of the object, and when it is determined that the object corresponding to the control target is generated as the result of determination, the object may be provided to the tracking step (S30).

In addition, in step S21, it may be determined whether or not an object corresponding to the control target is generated on the basis of the object, and when it is determined that the object corresponding to the control target is generated as the result of determination, the information associated with the control target in the previous scan may be fed back to the object generating step (S10).

Specifically, in step S21, it may be determined whether or not an object corresponding to the control target is generated on the basis of the object.

That is, in step S21, an object may be provided first from step S10. Then, it may be determined whether or not an object corresponding to the control target is generated on the basis of the object provided from step S20.

In an example, in step S21, it may be determined that an object corresponding to the control target is generated on the basis of the objects provided from step S10.

That is, in step S21, when an object corresponding to the control target exists among the objects provided from step S10, it may be determined that an object corresponding to the control target is generated.

In another example, in step S21, it may be determined that an object corresponding to the control target is not generated on the basis of the objects provided from step S10.

That is, in step S21, when an object corresponding to the control target does not exist among the objects provided from step S10, it may be determined that an object corresponding to the control target is not generated.

In step S21, depending on the determination result as to whether or not the object corresponding to the control target is generated, at least one of information and an object associated with the control target in the previous scan may be provided.

In an example, in step S21, when it is determined that the object corresponding to the control target is generated as the result of determining whether or not the object corresponding to the control target is generated, the object may be provided to the tracking step (S30).

In another example, in step S21, when it is determined that the object corresponding to the control target is not generated as a result of determining whether or not the object corresponding to the control target is generated, the information associated with the control target in the previous scan may be fed back to the object generating step S10.

Figure 19:
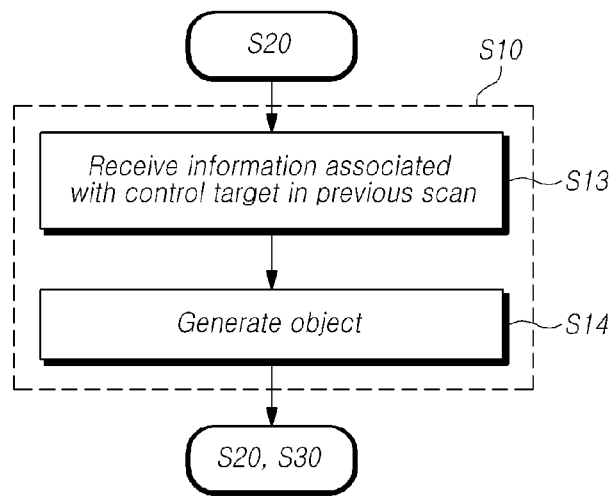

Referring to FIG. 19, in step S10, an object may be generated on the basis of the information associated with the control target in the previous scan.

Specifically, from step S20, information associated with the control target in the previous scan may be fed back first (S13). Then, an object may be generated on the basis of the information associated with the control target in the previous scan and fed back from step S20 (S14).

Figure 20:
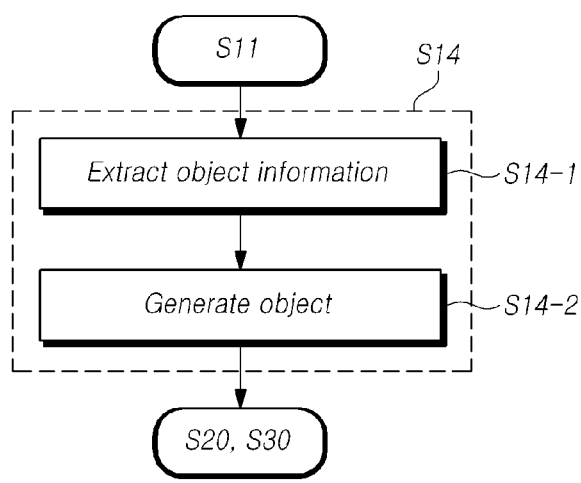

Referring to FIG. 20, in step S14, object information corresponding to the control target may be extracted on the basis of the information associated with the control target in the previous scan, and an object may be generated on the basis of the object information corresponding to the control target.

Specifically, first, the object information corresponding to the control target may be extracted on the basis of the information associated with the control target in the previous scan (S14-1). Then, an object may be generated on the basis of the object information corresponding to the control target (S14-2).

Figure 21:
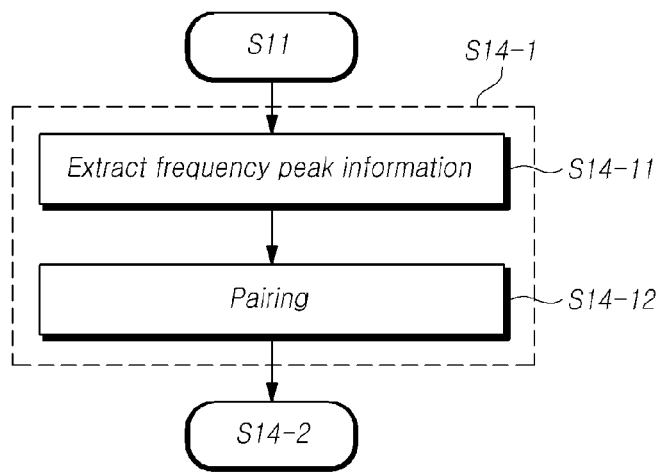

Referring to FIG. 21, in step S14-1, frequency peak information may be extracted from the information associated with the control target in the previous scan, and the object information corresponding to the control target may be extracted by pairing the frequency peak information. In addition, in step S14-2, an object corresponding to the control target may be generated on the basis of the object information corresponding to the control target.

That is, in step S14-11, the frequency peak information may be extracted from the information associated with the control target in the previous scan using a signal processing algorithm.

Thus, in step S14-11, the frequency peak information may be extracted from the information associated with the control target in the previous scan using the CFAR algorithm in up-chirp and down-chirp.

In addition, in step S14-12, the object information corresponding to the control target may be extracted by pairing the frequency peak information using the signal processing algorithm.

In addition, in step S14-2, an object may be generated on the basis of the object information corresponding to the control target using the signal processing algorithm.

In step S14-2, an object may be provided.

Specifically, in step S14-2, the object may be provided in at least one of the object providing step (S20) and the tracking step (S30).

Figure 22:
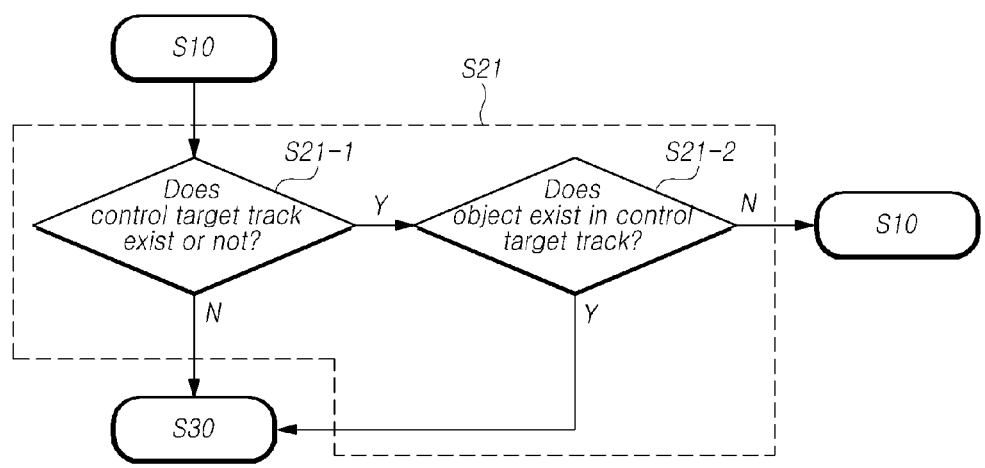

Referring to FIG. 22, first, it may be determined whether or not a control target track exists (S21-1).

In an example, in step S21-1, when the control target track exists, it may be determined that the control target track exists. That is, in step S21-1, when the control target track in the previous scan exists in the current scan, it may be determined that the control target track exists in the current scan.

In another example, in step S21-1, when the control target track does not exist, it may be determined that the control target track does not exist. That is, in step S21-1, when the control target track in the previous scan does not exist in the current scan, it may be determined that the control target track does not exist in the current scan.

In step S21-1, at least one of the determination result as to whether or not a control target track exists and an object may be provided.

In an example, in step S21-1, at least one of a determination result as to whether the control target track exists, a determination result that the control target track exists when it is determined that the control target track exists, and an object may be provided to step S21-2.

In another example, in step S21-1, when it is determined that the control target track does not exist as a result of determining whether the control target track exists, at least one of a determination result that the control target track does not exist, and an object may be provided to the tracking step (S30).

In step S21-2, it may be determined whether or not an object exists in the control target track depending on the determination result as to whether or not the control target track exists, and the information contained in the control target track in the previous scan may be fed back to the object generating step (S10) depending on the determination result.

In step S21-2, when it is determined that the control target track exists, it may be determined whether or not an object exists in the control target track, and when it is determined that the object does not exist in the control target track, the information contained in the control target track in the previous scan may be fed back to the object generating step S10.

In step S10, an object may be generated on the basis of the information contained in the control target track in the previous scan.

Specifically, in step S21-2, it may be determined whether or not an object exists in the control target track depending on the determination result as to whether the control target track exists.

That is, in step S21-2, at least one of the determination result that the control target track exists, and an object may be received from step S21-1.

In an example, in step S21-2, when it is determined that the control target track exists in step S21-1, that is when a determination result that the control target track exists is provided from step S21-1, it may be determined whether or not an object exists in the control target track.

In another example, in step S21-2, when it is determined that the control target track does not exist in step S21-1, that is when a determination result that the control target track exists is not provided from step S21-1, it may not be determined whether or not an object exists in the control target track.

In step S21-2, depending on the determination result as to whether or not an object exists in the control target track, at least one of a determination result as to whether an object exist in the control target track, the information contained in the control target track in the previous scan, and the object may be provided.

In an example, in step S21-2, when it is determined that the object exists in the control target track as the result of determining whether or not the object exists in the control target track, at least one of the determination result that the object exists in the control target track, and an object may be provided to the tracking step S30.

In another example, in step S21-2, when it is determined that the object does not exist in the control target track as the result of determining whether the object exists in the control target track, at least one of the determination result that the object does not exist in the control target track and the information contained in the control target track in the previous scan may be fed back to the object generating step (S10).

Figure 23:
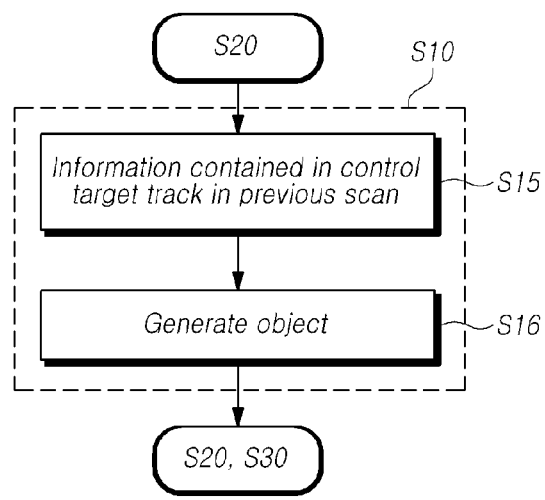

Referring to FIG. 23, in step S10, an object may be generated on the basis of the information contained in the control target track in the previous scan.

Specifically, in step S15, information contained in the control target track in the previous scan may be fed back first from step S20. Then, an object may be generated on the basis of the information associated with the control target in the previous scan and fed back from step S20 (S16).

Figure 24:
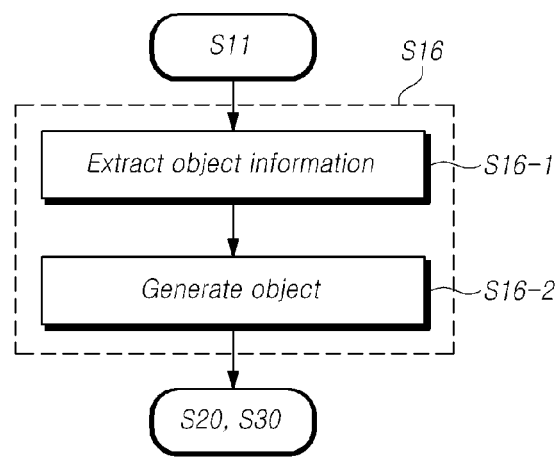

Referring to FIG. 24, in step S16, object information corresponding to the control target may be extracted on the basis of the information contained in the control target track in the previous scan, and an object may be generated on the basis of the object information corresponding to the control target.

Specifically, first, the object information corresponding to the control target may be extracted on the basis of the information contained in the control target track in the previous scan (S16-1). Then, an object may be generated on the basis of the object information corresponding to the control target (S16-2).

Figure 25:
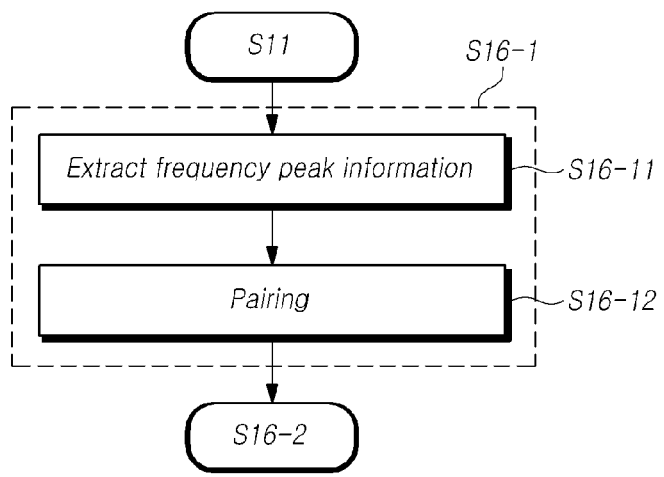

Referring to FIG. 25, in step S16-1, frequency peak information may be extracted from the information contained in the control target track in the previous scan, and the object information corresponding to the control target may be extracted by pairing the frequency peak information. In addition, in step S16-2, an object may be generated on the basis of the object information corresponding to the control target.

That is, in step S16-11, the frequency peak information may be extracted from the information contained in the control target track in the previous scan using a signal processing algorithm.

Thus, in step S16-11, the frequency peak information may be extracted from the information contained in the control target track in the previous scan using the CFAR algorithm in up-chirp and down-chirp.

In addition, in step S16-12, the object information corresponding to the control target may be extracted by pairing the frequency peak information using the signal processing algorithm.

In addition, in step S16-2, an object may be generated on the basis of the object information corresponding to the control target using the signal processing algorithm.

In step S16-2, an object may be provided.

Specifically, in step S16-2, the object may be provided in at least one of the object providing step (S20) and the tracking step (S30).

Hereinafter, a vehicle control method according to the present embodiments will be described with reference to the accompanying drawings. Particularly, a description of the portions overlapping with the target detection apparatus, the vehicle control apparatus, and the target detection method according to the present embodiments described above with reference to FIGS. 1 to 25 will be omitted in the following for the sake of brevity of description.

The vehicle control method according to the present embodiments may be performed through the target detection apparatus and the vehicle control apparatus.

The vehicle control method according to the present embodiments may include: a step of measuring a signal reflected from a target; generating an object on the basis of signal information acquired on the basis of a signal reflected from the target and determining whether an object corresponding to the control target is generated on the basis of the object, generating an object by feeding back information associated with the control target in previous scan depending on a determination result, and selecting a control target on the basis of the generated object so as detect the target; and controlling the vehicle according to the control target.

Figure 26:
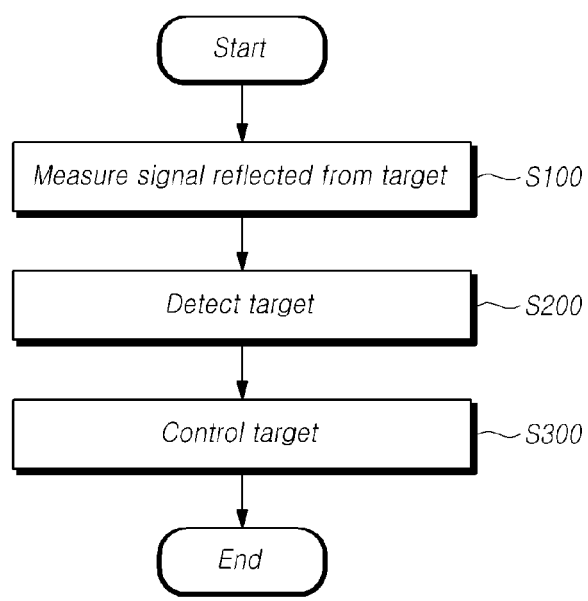
FIG. 26 is an overall flowchart for explaining a vehicle control method according to the present embodiments.

FIG. 26 is an overall flowchart for explaining a vehicle control method according to the present embodiments.

Referring to FIG. 26, the vehicle control method according to the present embodiments may include a step of measuring a signal reflected from a target (S100), a step of detecting the target (S200), and a step of controlling a vehicle (S300).

First, a signal reflected from the target may be measured (S100).

Then, an object may be generated on the basis of the signal information acquired on the basis of the signal reflected from the target, it may be determined whether or not an object corresponding to the control target is generated on the basis of the generated object, an object may be generated by feeding back information associated with the control target in previous scan depending on a determination result, and a control target may be selected on the basis of the generated object so as to detect the target (S200).

Meanwhile, since the target detection method of FIG. 26 is the same as the target detection method described above with reference to FIGS. 8 to 25, a description of the target detection method of FIG. 26 is omitted for the sake of brevity of description.

Thereafter, the vehicle may be controlled according to the control target (S300).

Figure 27:
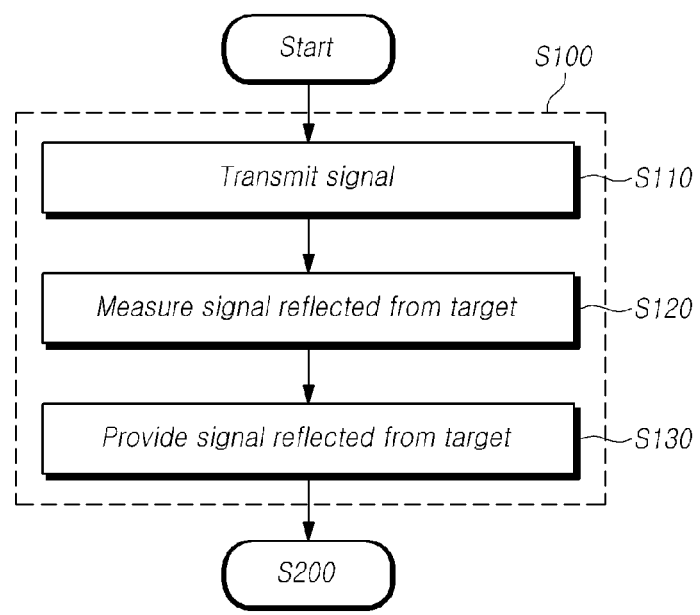
FIG. 27 is a specific flowchart for explaining a method of measuring a signal reflected from a target according to the present embodiments.

FIG. 27 is a specific flowchart for explaining a method of measuring a signal reflected from a target according to the present embodiments.

Referring to FIG. 27, in step S100, a signal reflected from the target may be measured.

Specifically, a signal may be transmitted first (S110). Thereafter, the signal reflected from the target may be measured (S120). Thereafter, the signal reflected from the target may be provided to step S200 (S130).

Here, the signal reflected from the target may include a time domain signal.

In step S100, the signal reflected from the target may be measured through at least one sensor.

Here, at least one sensor may include a radar sensor. However, without being limited thereto, the at least one sensor may include any sensor as long as it can measure a signal reflected from the target. In particular, the at least one sensor may include an image sensor and a non-image sensor. However, without being limited thereto, the at least one sensor may include any sensor as long as it can measure the target.

Figure 28:
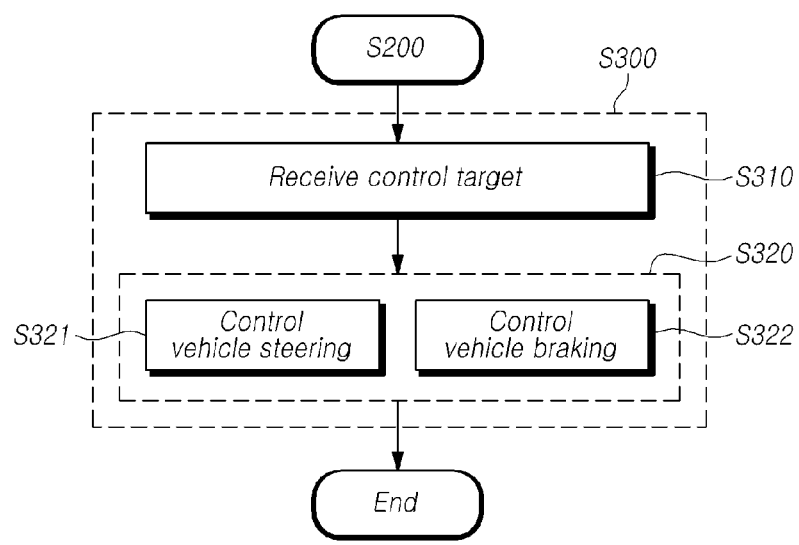
FIG. 28 is a specific flowchart for explaining a vehicle control method according to the present embodiments.

FIG. 28 is a specific flowchart for explaining a vehicle control method according to the present embodiments.

Referring to FIG. 28, in step S300, the vehicle may be controlled according to the control target.

Specifically, first, a control target may be provided from step S200 (S310). Then, the operation of the vehicle may be controlled on the basis of the control target provided from step S200 (S320).

In step S320, at least one of vehicle steering and vehicle braking may be controlled.

That is, in step S321, vehicle steering may be controlled according to the control target.

Specifically, first, the control target may be provided from step S200 (S310). Then, the vehicle steering may be controlled on the basis of the control target provided from step S200 (S321).

That is, in step S322, vehicle braking may be controlled according to the control target.

Specifically, first, the control target may be provided from step S200 (S310). Then, the vehicle braking may be controlled on the basis of the control target provided from step S200 (S322).

Hereinafter, a computer system according to the present embodiments will be described with reference to the accompanying drawings.

Figure 29:
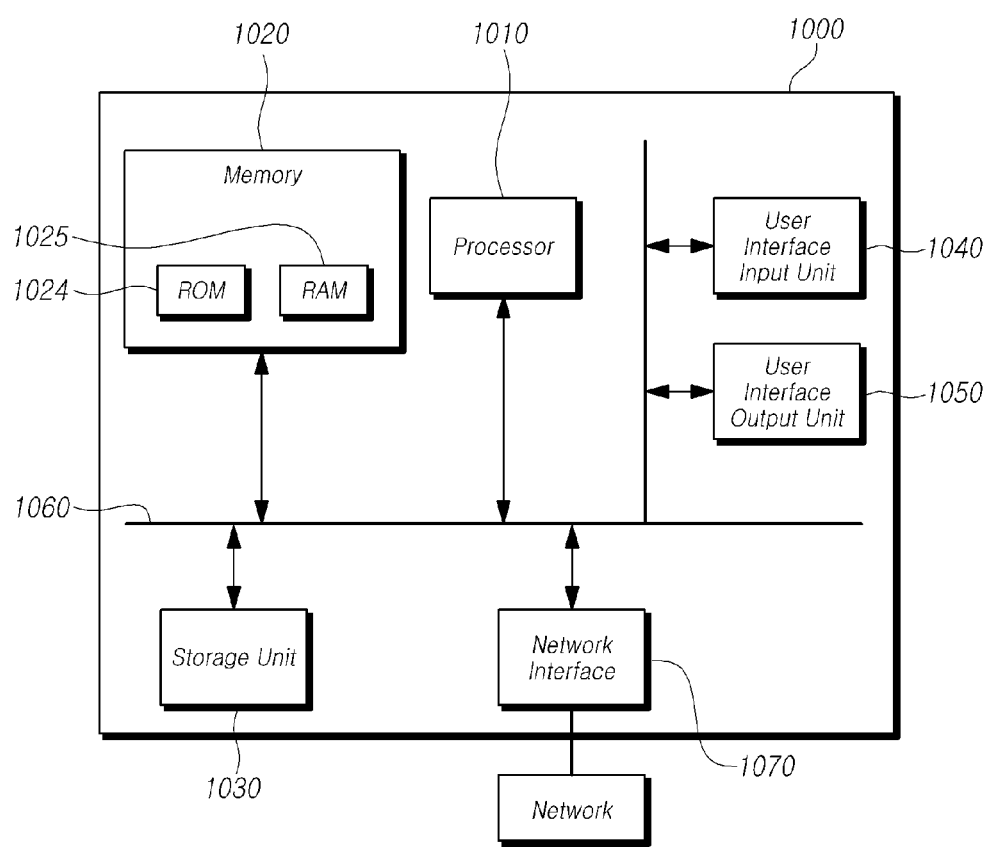
FIG. 29 is a block diagram illustrating a computer system for a target detection apparatus and a vehicle control apparatus according to the present embodiments.

FIG. 29 is a block diagram illustrating a computer system for a target detection apparatus and a vehicle control apparatus according to the present embodiments.

Referring to FIG. 29, the present embodiments described above may be implemented in a computer system, for example, a computer-readable storage medium. As illustrated in the figure, a computer system 1000 for a target detection apparatus and a vehicle control apparatus may include includes at least one processor 1010, memory 1020, a storage unit 1030, a user interface input unit 1040, and a user interface output unit 1050, which may communicate with each other via a bus 1060. In addition, the computer system 1000 may also include a network interface 1070 for connecting to a network. The processor 1010 may be a CPU or a semiconductor device that executes processing instructions stored in the memory 1020 and/or the storage unit 1030. The memory 1020 and the storage unit 1030 may include various types of volatile/nonvolatile storage mediums. For example, the memory may include ROM 1024 and RAM 1025.

Accordingly, the present embodiments may be implemented in a computer-implemented method or in a nonvolatile computer storage medium, which is stored with computer-executable instructions. When the instructions are executed by a processor, a method according to at least one embodiment of the present embodiments may be performed.

Figure 30:
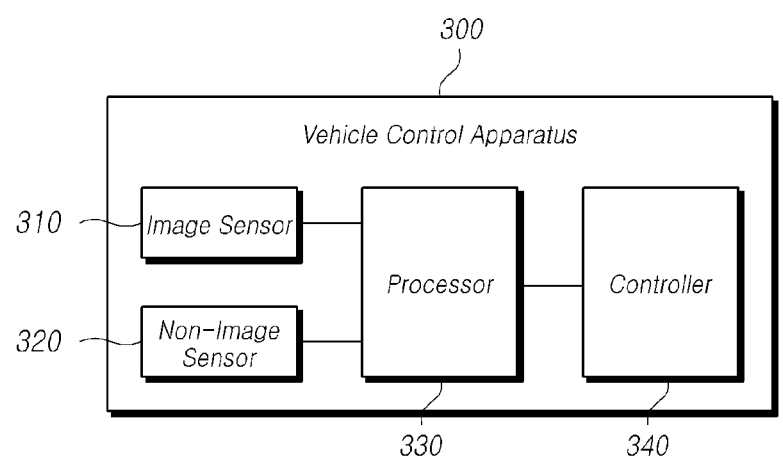
FIG. 30 is a block diagram for explaining a vehicle control apparatus according to the present embodiments.

FIG. 30 is a block diagram for explaining a vehicle control apparatus according to the present embodiments.

Referring to FIG. 30, a vehicle control apparatus 300 according to the present embodiments may include at least one of an image sensor 310 and a non-image sensor 320. The vehicle control apparatus 300 according to the present embodiments may include a processor 330. The vehicle control apparatus 300 according to the present embodiments may include a controller 340.

Here, the image sensor 310 and the non-image sensor 320 may perform all the functions of the sensor module 210 described above with reference to FIG. 4.

Here, the controller 340 may perform all the functions of the target detection module 220 and the control module 230 described above with reference to FIG. 4 and the functions of the target detection apparatus 100 described above with reference to FIG. 1.

Particularly, the vehicle control device 300 according to the embodiments, which will be described later with reference to FIG. 30, may perform the functions in the target detection apparatus 100, the vehicle control apparatus 200, the target detection method, and the computer system 1000 for the target detection apparatus 100 and the vehicle control apparatus 100, which are described above with reference to FIGS. 1 to 29, and a detailed description of the functions will be omitted in the following description for the sake of brevity of description.

Next, referring to FIG. 30 the image sensor 310 is operable to be disposed in the vehicle so as to have a field of view for the exterior of the vehicle, and may be configured to capture image data.

The non-image sensor 320 may be disposed in the vehicle so as to have a sensing area for the exterior of the vehicle and to capture sensing data, and may be configured with a radar sensor.

At least one processor 330 may be configured to process at least one of image data captured by the image sensor 310 and sensing data captured by the non-image sensor 320.

Here, the at least one processor 330 may include two processors, but is not limited thereto. The at least one processor 330 may include one processor or three or more processors. In particular, when the at least one processor 330 includes two processors, a first processor may be connected to the image sensor 310 and a second processor may be connected to the non-image sensor 320. Hereinafter, the first processor and the second processor will be referred to as a processor 330 for the sake of brevity of description.

The controller 340 may be configured to select a control target, responsive at least in part to processing by the processor 330 of at least one of the image data and the sensing data.

Specifically, the controller 340 may generate an object, responsive at least in part to the processing by the processor 330 of at least one of the image data and the sensing data.

In one example, the controller 340 may generate an object, responsive at least in part to the processing by the processor 330 of the image data.

In another example, the controller 340 may generate an object, responsive at least in part to the processing by the processor 330 of the sensing data.

In another example, the controller 340 may generate an object, responsive at least in part to the processing by the processor 330 of at least one of the image data and the sensing data.

In addition, the controller 340 may determine whether or not an object corresponding to the control target is generated on the basis of the object, may generate an object by feeding back information associated with the control target in the previous scan depending on the result of determination, and may select a control target on the basis of the generated object.

More specifically, the controller 340 may determine whether or not an object corresponding to the control target is generated on the basis of the object, and when it is determined that the object corresponding to the control target is not generated as the result of determination, the controller 340 may feed back the information associated with the control target in the previous scan.

Here, the controller 340 may extract object information, and may generate an object on the basis of the object information.

In addition, the controller 340 may extract frequency peak information from the signal information, may pair the frequency peak information so as to extract object information, and may generate an object on the basis of the object information.

In addition, the controller 340 may determine whether or not a control target track exists, may determine whether or not an object exists in the control target track depending on the determination result as to whether or not the control target track exists, and may feed back the information contained in the control target track in the previous scan depending on the determination result.

In addition, when it is determined that the control target track exists, the controller 340 may determine whether or not an object exists in the control target track, and when it is determined that the object does not exist in the control target track, the controller 340 may feed back the information contained in the control target track in the previous scan.

In addition, the controller 340 may generate an object on the basis of the information contained in the control target track in the previous scan.

In addition, the controller 340 may acquire frequency domain signal information, and may generate an object on the basis of the frequency domain signal information.

The controller 340 may generate track information by tracking the object, and may select a control target on the basis of the track information.

Although a target detection apparatus and method and a vehicle control apparatus and method according to the present embodiments have been described above, the present disclosure is not limited thereto. Various modifications and changes can be made without departing from the technical spirits of the present disclosure, and belong to the scope of the present disclosure.

What is claimed is:

1. A vehicle control apparatus comprising:
   an image sensor disposed at a vehicle so as to have a field of view of exterior of the vehicle, and configured to capture image data;
   a processor configured to process the image data captured by the image sensor; and
   a controller configured to
      generate an object based on the processed image data, and
      select, based on the generated object, a first control target to be tracked,
   wherein the controller is configured to:
      determine whether an object corresponding to the first control target is generated from the processed image data in a current scan of the image sensor, and
      when the object corresponding to the first control target is not generated in the current scan of the image sensor, generate the object corresponding to the first control target based on information associated with the first control target in a previous scan of the image sensor and select a second control target based on the generated object corresponding to the first control target.

2. The vehicle control apparatus of claim 1, wherein the controller is configured to:
    extract frequency peak information from the image data, responsive at least in part to processing by the processor of the image data; and
    extract object information by pairing the frequency peak information, and generate the object based on the object information.

3. The vehicle control apparatus of claim 1, wherein the controller is configured to:
    determine whether or not a control target track exists, responsive at least in part to processing by the processor of the image data; and
    when the control target track exists, determine whether or not the object corresponding to the first control target exists in the control target track and generate the object corresponding to the first control target based on information contained in the control target track in the previous scan.

4. The vehicle control apparatus of claim 3, wherein when it is determined that the control target track exists, the controller is configured to:
    determine whether or not the object corresponding to the first control target exists in the control target track; and
    when it is determined that the object corresponding to the first control target does not exist in the control target track, generate the object corresponding to the first control target based on the information contained in the control target track in the previous scan.

5. The vehicle control apparatus of claim 1, wherein the controller is configured to:
    perform pre-processing, responsive at least in part to processing by the processor of the image data;
    acquire frequency domain signal information based on the pre-processing; and
    generate the object based on the frequency domain signal information.

6. The vehicle control apparatus of claim 1, wherein the controller is configured to generate track information by tracking the object and select the first control target based on the track information.

7. A target detection apparatus comprising:
    a generation unit configured to generate an object based on signal information; and
    a providing unit configured to
        determine whether or not an object corresponding to a control target is generated based on the generated object, and
        when the object corresponding to the control target is not generated in the current scan of the image sensor, generate the object corresponding to the control target based on information associated with the control target in a previous scan of the generation unit.

8. The target detection apparatus of claim 7, wherein the providing unit comprises:
    a first determination unit configured to determine whether or not a control target track exists; and
    a second determination unit configured to, when the control target track exists, determine whether or not an object exists in the control target track and generate an object based on information contained in the control target track in the previous scan.

9. A target detection method comprising:
    generating an object based on signal information;
    selecting, based on the generated object, a control target to be tracked;
    determining whether or not an object corresponding to the control target is generated in a current scan; and
    when the object corresponding to the control target is not generated in the current scan, generating the object corresponding to the control target based on information associated with the control target in a previous scan.

* * * * *